June 5, 1923.
R. GUTHRIDGE
1,457,431
RECEPTACLE AND AGITATOR THEREFOR
Filed Sept. 9, 1921
2 Sheets-Sheet 1
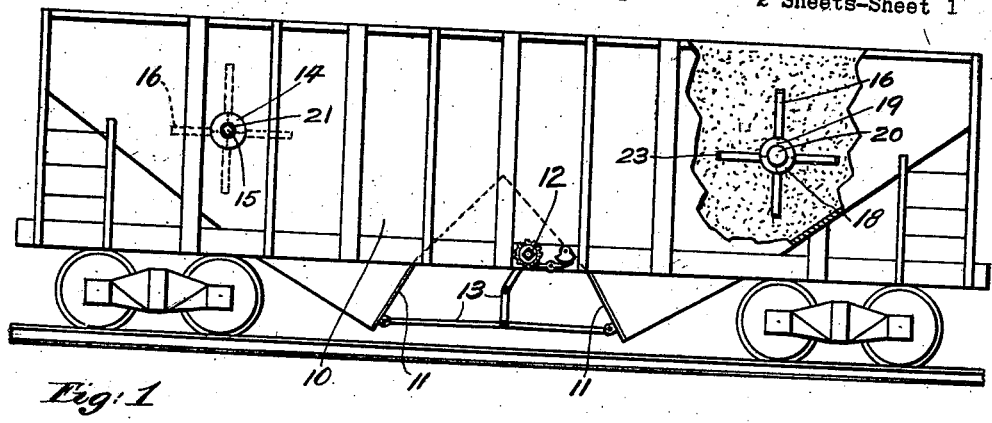
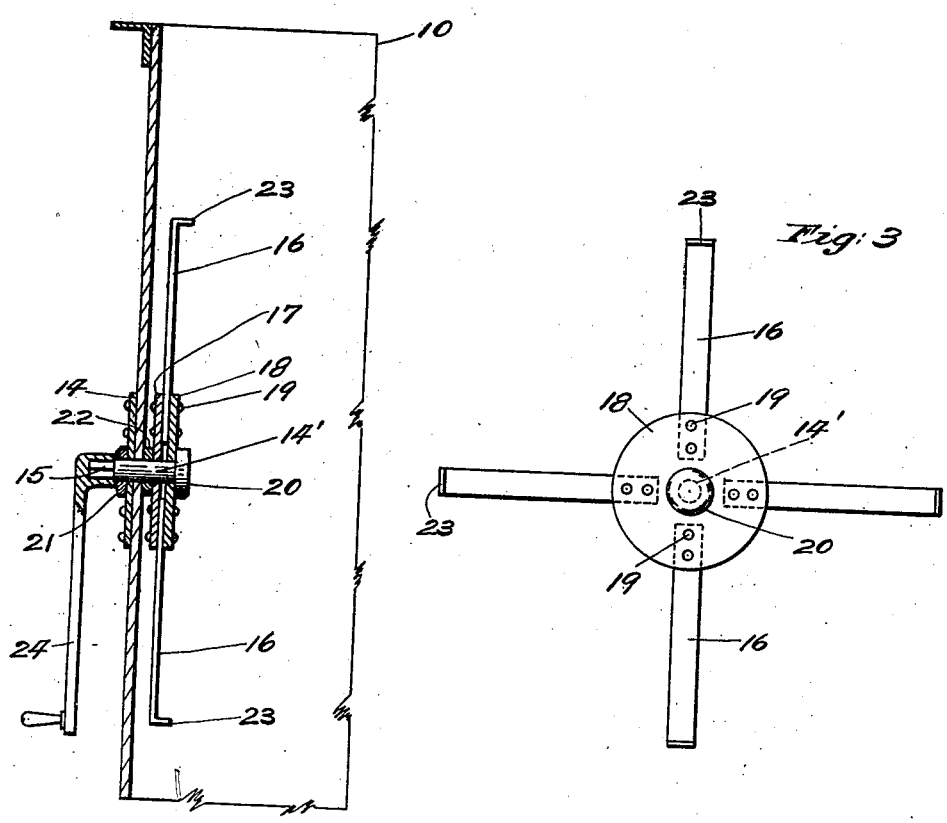
INVENTOR.
Richard Guthridge.
BY William J. Jackson
ATTORNEY.

June 5, 1923.
R. GUTHRIDGE
1,457,431
RECEPTACLE AND AGITATOR THEREFOR
Filed Sept. 9, 1921
2 Sheets-Sheet 2
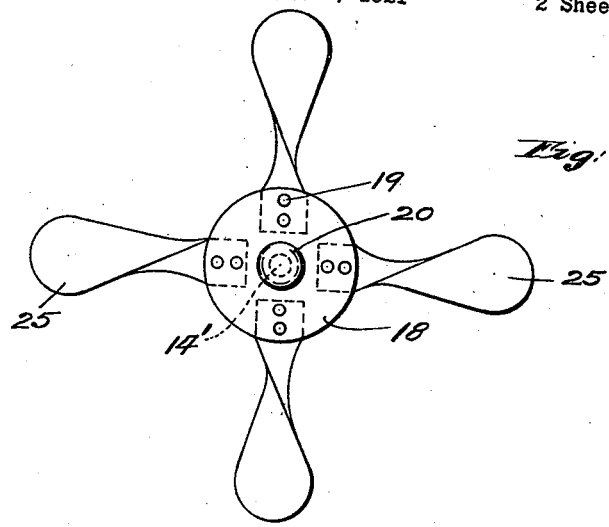
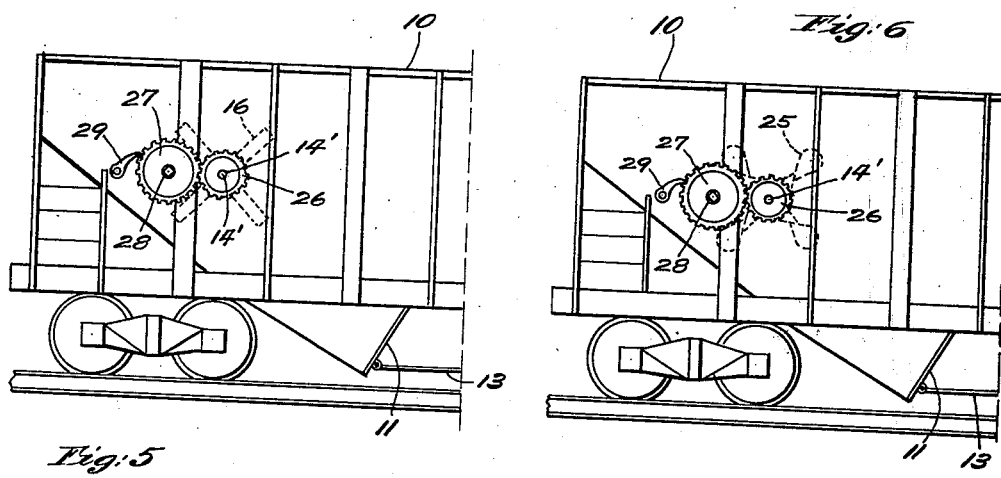
INVENTOR.
Richard Guthridge
BY
William J. Jackson
ATTORNEY Patented June 5, 1923.

1,457,431

UNITED STATES PATENT OFFICE.

RICHARD GUTHRIDGE, OF NORRISTOWN, PENNSYLVANIA.

RECEPTACLE AND AGITATOR THEREFOR.

Application filed September 9, 1921. Serial No. 499,381.

*To all whom it may concern:*

Be it known that I, RICHARD GUTHRIDGE, a citizen of the United States, residing at the city of Norristown, county of Montgomery, and State of Pennsylvania, have invented certain new and useful Improvements in Receptacles and Agitators Therefor, of which the following is a specification.

This invention, generally stated, relates to railroad cars and has more especial relation to freight cars such as are employed in the transportation of soft coal, lime, dirt and like material calculated to "pack" in transit. Cars of this type, usually termed gondola cars, are equipped at their bottoms with central openings, closed by outwardly swinging doors. Movement of the doors in proper direction is secured by applying a tool, termed a crank, to a shaft connected to said doors by links as is well known in the art to which the present invention relates. Experience dictates that when these doors are permitted to open, such material as is located centrally of a car will fall through the openings, but that such material as is located at each end of a car has, in transit, become so "packed" that it is necessary for laborers to enter a car and by means of picks and other implements to loosen said packed material in order that the same may be caused to pass to the openings in the car bottom. Not only does this procedure consume time and cause expense but the laborers frequently puncture the walls of a car with their implements so that said walls must be repaired by covering the punctured portions with plates.

The leading object of the present invention may be said to be to overcome the above described disadvantageous features and provide means for a car of the character stated whereby a train-hand after opening the doors of a gondola-car, may, with the same tool employed for that purpose operate, from the car exterior, certain agitating mediums whereby any material as is "packed" at the car ends may be readily and expeditiously loosened so as to pass through the openings in the car bottom. Other and further objects relate to general arrangements, combinations and connections of parts for attaining the results contemplated by said leading object.

The invention consists of the improvements hereinafter described and finally claimed.

The nature, characteristic features and scope of the invention will be more fully understood from the following description taken in connection with the accompanying drawings forming part thereof and in which:—

Fig. 1, is a view in side elevation, partly broken away, of a rail-road car equipped with agitating devices embodying features of the invention.

Fig. 2, is a fragmentary view, drawn to an enlarged scale, illustrating one of said agitating devices and manner of operating same.

Fig. 3, is a view in side elevation of one of said devices.

Fig. 4, is a similar view of a modified form of agitating blades.

Fig. 5, is a fragmentary view of car showing a modified form of operating blades of the type shown in Figs. 1, 2 and 3, and Fig. 6, is a similar view of a modified form of operating blades of the type shown in Fig. 4.

For the purpose of illustrating my invention, I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings and referring more particularly to Figs. 1 to 3 inclusive 10, designates a so-called gondola-car of steel construction the bottom of which is provided with central openings closed by doors 11. These doors move outwardly around pivot points and are operable from a shaft 12 through pivoted levers 13 when a tool termed a crank, see Fig. 2, is applied to the squared end of said shaft as is well known in the art to which the present invention relates and hence these parts have been shown more or less diagrammatically. The bottom walls of the car incline upwardly from opposite sides of the openings in the bottom thereof. This is so that the car contents can be more readily caused to egress through said openings. Each side-wall of a car 10 adjacent each end thereof is provided with an agitating device, about to be described, and as each device is of duplicate formation a description of one will suffice. Fixed to an exterior wall of such car, as by rivets, is a plate 14 apertured in alignment with an aperture through said wall. Passing through said apertures is a stud-shaft 14' the outer end of which is squared as at 15 of a size corresponding with the squared end of shaft 12 and the other end of which has fixed thereto agitating blades 16 the number and shape of which is immaterial. The blades as shown in Figs. 1, 2 and 3 are of rectangular configuration and are clamped between plates 17 and 18 as by rivets 19. The plates 14, 17 and 18 are of disc-like form. The stud-shaft has at its inner end a head 20 and at its outer end a removable collar 21 to prevent endwise movement of the stud-shaft. In addition a collar 22 serves to space the blades 16 from the side-wall. The outer end of each blade 16 is provided with an inwardly projected toe 23 to assist in agitating of the car contents when the blades are rotated. Rotation thereof is secured by means of crank 24 being fitted to the squared end of stud-shaft and manually operated by a train-hand. Thus any material, as soft coal, packed at the car ends may be readily loosened so as to egress through the openings in the car bottom. Instead of rectangular agitating blades I may employ other types, for instance, of the general configuration of propeller blades as indicated at 25 in Fig. 4. I may also operate the stud-shaft 14' through the intervention of gear-wheels as shown in Figs. 5 and 6. In such case a stud-shaft is provided exteriorly of a car with a relatively small gear-wheel 26, meshing with which is a gear-wheel 27 of larger diameter mounted upon a shaft 28 having a squared end to receive crank 24. A detent 29 is employed to prevent retrograde movement of gear-wheel 27. Either type of blades may be operated in this manner.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. The combination of an open top receptacle, including vertical side walls and end walls which incline toward a normally closed discharge in the receptacle bottom and an opening device for said discharge with a plurality of independently mounted, rotatable, material displacing devices oppositely arranged in pairs at each end of the receptacle and so positioned upon said side walls that when rotated, "packed" material at the receptacle ends is caused to move along said inclined walls to said opening and means common to said opening device and said displacing devices for independently operating the same.

2. In a construction of the character stated, a vertical supporting wall having journaled therein a horizontally disposed stud-shaft one end of which is provided with a head and the other end of which is squared to removably receive an operating tool, an agitating device carried by said stud-shaft, means upon said stud-shaft for spacing said device from said wall and for maintaining said device in abutting relation with said head and means adjacent the squared end of said stud-shaft for preventing endwise movement thereof.

3. In a construction of the character stated, a vertical supporting wall, a stud-shaft rotatable therein, a pair of discs fitted upon and rotatable with said stud-shaft, a plurality of radially disposed blades positioned between said discs said blades having plane surfaces and the outer end of each of which terminates in a projected portion extending substantially at right angles to the body part thereof and means for clamping said blades between said discs.

In testimony whereof, I have hereunto signed my name.

RICHARD J. GUTHRIDGE.